United States Patent [19]

Kim et al.

[11] Patent Number: 5,255,310
[45] Date of Patent: Oct. 19, 1993

[54] METHOD OF APPROXIMATELY MATCHING AN INPUT CHARACTER STRING WITH A KEY WORD AND VOCALLY OUTPUTTING DATA

[75] Inventors: Eung I. Kim; Jae I. Kim; Jong R. Lee, all of Seoul, Rep. of Korea

[73] Assignee: Korea Telecommunication Authority, Rep. of Korea

[21] Appl. No.: 931,135

[22] Filed: Aug. 17, 1992

Related U.S. Application Data

[63] Continuation of Ser. No. 563,481, Aug. 7, 1990, Pat. No. 5,163,084.

[30] Foreign Application Priority Data

Aug. 11, 1989 [KR] Rep. of Korea ............ 89-11435
Mar. 14, 1990 [KR] Rep. of Korea ............ 90-3367

[51] Int. Cl.$^5$ ................ H04M 1/64; H04M 11/08
[52] U.S. Cl. ............................... 379/88; 379/91; 379/97; 379/201
[58] Field of Search ............ 379/97, 88, 67, 52, 379/201, 91

[56] References Cited

U.S. PATENT DOCUMENTS

| | | | |
|---|---|---|---|
| 4,754,474 | 6/1988 | Feinson | 379/96 |
| 4,782,509 | 11/1988 | Shepard | 379/88 |
| 4,817,129 | 3/1989 | Riskin | 379/88 |
| 4,866,759 | 9/1989 | Riskin | 379/97 |

Primary Examiner—Thomas W. Brown
Attorney, Agent, or Firm—Merchant Gould Smith Edell Welter & Schmidt

[57] ABSTRACT

A method for approximately matching a DTMF input character string with a key word and for vocally outputting information in response to the input character string. A telephone apparatus is provided to transmit a dual tone multi-frequency (DTMF) signal by utilizing a character panel including a plurality of DTMF buttons which are arranged in order therein. An exchange apparatus intermediates the DTMF signal. A DTMF receiver apparatus converts the DTMF signal into a corresponding digital signal. A service provider terminal apparatus inputs a plurality of key words corresponding to each service name and information data to be provided. A key word storage apparatus includes a service name file unit for storing a service name file, and a key word dictionary unit for storing a key word dictionary. A text information storage apparatus stores a plurality of information data corresponding to each service name. A central processing unit converts a digital signal outputted from the DTMF receiver apparatus into an input character string to match the input character string with the key words stored in the key word storage apparatus in order to provide information data. A voice output apparatus is connected from the central processing unit for converting a digital voice data signal into a voice signal to thereby provide the desired information service to the user.

2 Claims, 4 Drawing Sheets

METHOD OF APPROXIMATELY MATCHING AN INPUT CHARACTER STRING WITH A KEY WORD AND VOCALLY OUTPUTTING DATA

This is a continuation of application Ser. No. 07/563,481, filed on Aug. 7, 1990, now U.S. Pat. No. 5,163,084, issued on Nov. 10, 1992.

BACKGROUND OF INVENTION

1. Field of the Invention

The invention relates to a voice information service system, more particularly to a voice information service system utilizing approximately matched input character string and key word which are constituted by an access code corresponding to a desired specific character by combining DTMF (dual tone multi-frequency) signals to provide various vocal information services by means of a telephone, and an approximate matching method thereof.

2. Information Disclosure Statement

In general, when the user wants to research detailed information upon and/or after accessing a desired service in a voice information service system, a voice information service system has problems because an exact service number or an item name number must be inputted therein in a precise order, or a corresponding service name or an item name must be precisely inputted therein in order to obtain desired voice information service therefrom. For example, when a service for identifying a present stock quotation is requested by utilizing a telephone through the voice information service system, a desired service number or service name such as "stock market quote", must be exactly inputted therein. Otherwise, the desired service name and the service number must be authenticated by the system user to obtain a desired service.

In order to resolve the above problems, one object of the invention is to provide access to a voice information service system in which a desired specific character is inputted by selecting two buttons from among the number of buttons of a touch-tone type telephone and pressing them in a given sequence, thereby obtaining the desired service in the form of a vocal output.

Another object of the invention is to provide a voice information service system for inputting a continuous character string without making a distinction between component words, thereby providing a desired service through a touch-tone type telephone.

Another object of the invention is to provide a method for approximately matching an input character string with a key word in the vocal information service system.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be obtained by referring to both the summary of the invention and the detailed description, below, which describe the preferred embodiment in addition to the scope of the invention defined by the claims considered in conjunction with the accompanying drawings.

SUMMARY OF THE INVENTION

The voice information service system utilizing approximately matched input character string and key word, and the method for the approximate matching thereof of the present invention is defined by the claims with a specific embodiment shown in the attached drawings. For the purpose of summarizing the invention, the invention relates to a voice information system utilizing approximately matched input character string and key word. The voice information system comprises a telephone means for transmitting dual tone multi-frequency signals by pressing two buttons of a plurality of buttons and pressing them in an ordered sequence. The telephone means comprises a character panel including a plurality of buttons which are orderly arranged therein. An exchange means is provided for intermediating the DTMF signals received from the telephone means. A telephone line matching apparatus is connected from the exchange means for detecting a line status of the system and protecting the system from an instantaneous higher voltage. A DTMF receiver apparatus is also provided for converting the DTMF signal inputted from the telephone means into a corresponding digital signal. A service provider terminal means is provided for inputting a plurality of key words corresponding to a plurality of service names and a plurality of information data to be provided. A key word storage apparatus is provided with a service name file unit for storing a service name file in which a plurality of the service names and service numbers corresponding thereto are registered, and a key word dictionary unit for storing a key word dictionary in which a plurality of the key words and service numbers are registered. A text information storage apparatus is provided for storing a plurality of information data corresponding to each service name of information data to be provided, which is inputted from the service provider terminal means. A central processor unit is provided for converting digital signals outputted from the DTMF receiver apparatus into an input character string, reading information data corresponding to a service name, which is obtained by matching the input character string with the key words stored in the key word storage apparatus, from the text information storage apparatus to thereby provide read information data, converting the read information data into digital voice data, and receiving a service name, a key word and information data to be provided, which are newly registered by the service provider terminal means to transfer and to store the service name and the key word to and at the key word storage apparatus, the information data to and at the text information storage apparatus, respectively. A voice output apparatus is connected from the central processor unit, for converting digital voice data output signals into a. voice signal to transfer the voice signal through the telephone line matching apparatus and the exchanger means to the telephone means.

Preferably, the central processor unit comprises: an input unit for syllabicating an input character string inputted by a user into character units; a service name matching unit for attempting to match the input character string inputted from the input unit with a service name corresponding thereto of a plurality of the service names stored at the service name file unit; a key word matching unit connected to the service name matching unit for attempting to match the input character string with a key word corresponding thereto of a plurality of the key words stored at the key word storage apparatus to thereby determine at least one or more additional prospective service names; an optimum service name determining unit connected from the key word matching unit for determining one optimum service name of the prospective service names if more than two of the prospective service names exist; and, an output unit connected both to the service name matching unit and to the optimum service name determining unit for receiving a service name and/or an optimum service name from any one of the service name matching units and/or the optimum service name determining unit to thereby output information data corresponding to each service name and/or an optimum service name.

The present invention further includes a method for approximately matching an input character string with a key word in the voice information service system including a Central Processor Unit comprising the steps of:

A) discriminating as to whether all characters of an input character string, formed by syllabicating an input character string into a plurality of character numbers having a first character through a last character, are matched with all characters of a service name having a first character through a last character stored in the central processor unit;

B) discriminating as to whether a matched key word obtained by matching the first character of the input character string with the first character of the key word stored in the system exists, if all the characters of the input character string are not matched with all characters of a service name at step A);

C) discriminating as to whether a matched key word obtained by individually matching all remaining characters including the last character of the input character string with those of the key word exists, if the matched key word exists at step B);

D) storing service numbers and all the character numbers relating to matched key words, all the character numbers representing a corresponding character sequence of the input character string, in a matching result file, if the matched key words exist at step C);

E) sequentially adding a next character number either to the first character of the input character string at step B), or to the partially matched character thereof at step C), if the matched key words do not exist at step B) or C);

F) identifying whether the individual matching from the first character of the input character string to the last character of the input character string between those of the key word has been accomplished;

G) selecting optimum service names by investigating the matching result file stored at step D); and, H) determining the number of prospective services finally obtained by determining optimum service names at step G), both to output information data corresponding to the service name obtained either by taking one if the number of the prospective services is one, or by selecting one of them if the number thereof is two, thereby ending the method, and to return from step H) to step A), if the number thereof is either none or more than two.

According to one feature of the invention, the CPU (central processor unit) converts signals transferred from a DTMF receiver apparatus into an input character string to thereby provide a converted input character string, so that the converted input character string is discriminated as to whether it is matched with a service name or an item name stored at a service name file unit in the key word storage apparatus. Then, the CPU receives from an external computer or its text information storage apparatus employed therein information data corresponding to the service name or the item name if the matching therebetween is accomplished, and receives information data corresponding to a service name or an item name obtained by re-matching the input character string with a key word stored at the key word dictionary unit in the key word storage apparatus if the matching therebetween is not accomplished, respectively, and then transfers them to a voice output apparatus. The voice output apparatus then converts the text data into a voice signal to transmit it through a telephone line matching apparatus and an exchange means to the telephone means.

According to other features of the invention, a key word is provided by dividing a service name or an item name and an additional key word in the form of a compound noun type into its component word, and is then stored at the key word dictionary unit in alphabetic order to increase the processing speed of the CPU.

Therefore, in light of the fact that a key word is mainly made in the form of a compound noun type, the invention has advantages that a service name such as, for example, "Stockmarket", "Marketquotes", "Stockquotes" or "Stock", etc. can be inputted directly into the voice information service system through a MFC (multi-frequency code) type telephone which is well known in the art without inputting an exact service number or an exact service name such as, for example, "Stockmarketquotes", thereby providing a desired service to users.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be made to the following detailed description taken in conjunction with the accompanying drawings in which.

Similar reference characters refer to similar parts throughout the several views of the drawings.

DETAILED DESCRIPTION OF THE INVENTION

Figures 1, 5:
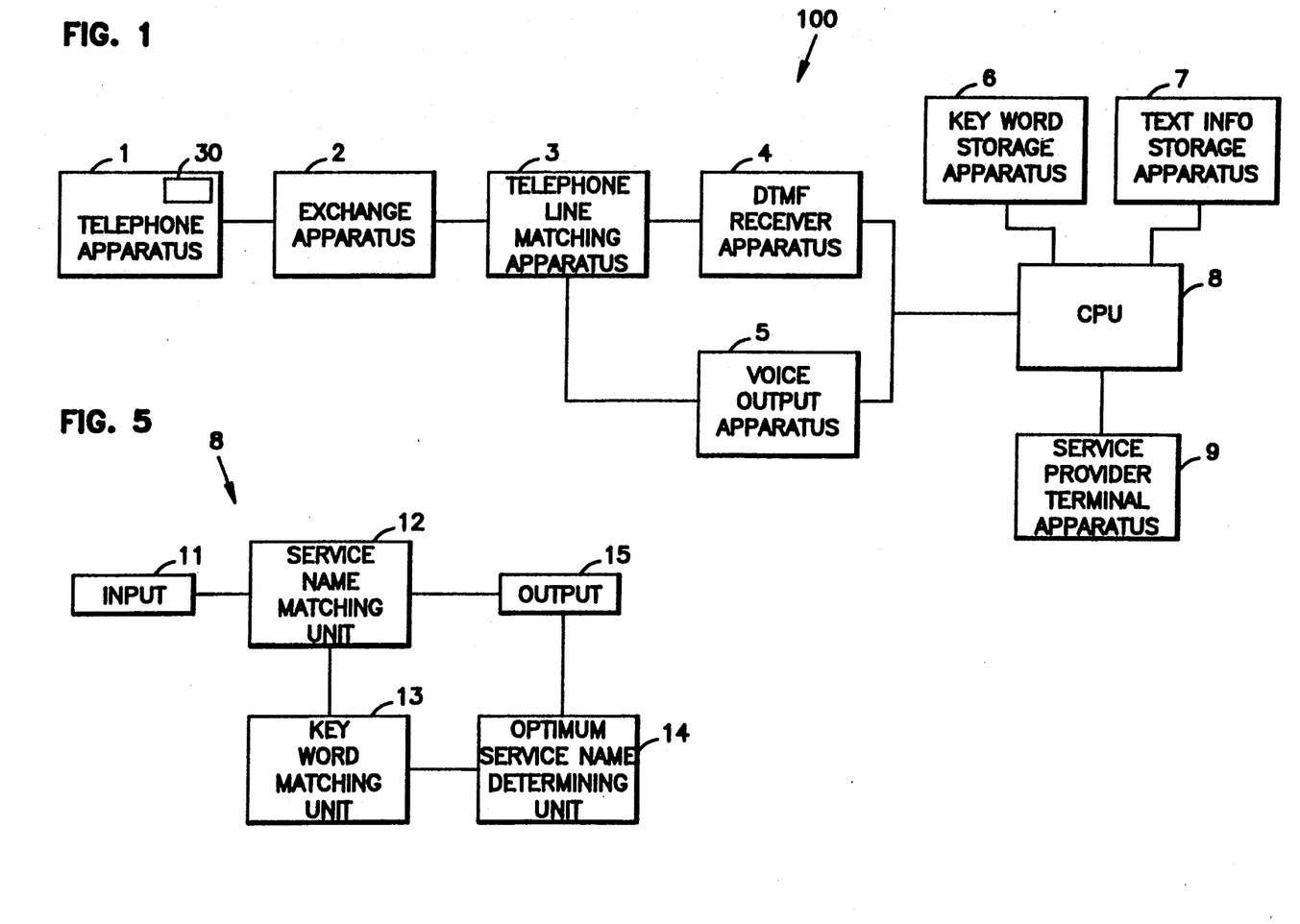
FIG. 1 is a block diagram representing a voice information service system according to the invention.
FIG. 5 is a block diagram illustrating matching procedures in CPU according to the invention; and, FIG. 6 is a detail flow chart illustrating matching procedures in CPU according to the invention.

FIG. 1 shows a voice information service system 100 for inputting a character string. DTMF signals inputted from character panel 30 for generating character data, which is attached to a telephone means 1 for subscriber, are supplied through a well known exchange means 2 for intermediating the character data to a telephone line matching apparatus 3. The telephone line matching apparatus 3 supervises a telephone line status of, for example, ringing signal tone and busy tone, etc., while it blocks the instantaneous higher voltage introduced therein due to such as, for example, a thunderbolt, thereby protecting the system. Also, the telephone line matching apparatus 3 is connected through a DTMF (dual tone multi-frequency) receiver apparatus 4 and a voice output apparatus 5, respectively, to a CPU 8. The CPU 8 is connected to a key word storage apparatus 6, a text information storage apparatus 7 and a service provider terminal means 9, respectively.

On the other hand, the DTMF receiver apparatus 4 converts DTMF signals inputted by a user into 4 bit digital signals to thereby supply converted digital signals to the CPU 8. The CPU 8 then converts the converted digital signals transmitted from the DTMF receiver apparatus 4 into a character string, and attempts to match the character string with a plurality of key words stored at the key word storage apparatus 6. The results of the approximately matching procedure thereof will be explained in detail in connection with FIG. 5.

Figure 4A:
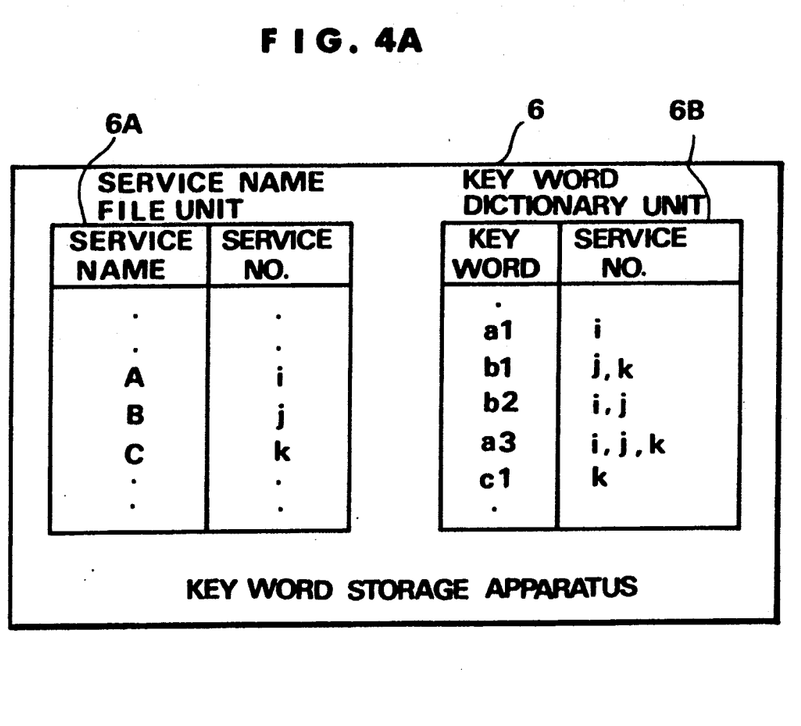
FIG. 4A and FIG. 4B are a key word storage apparatus and an information storage apparatus according to the invention.

Herein, the key word storage apparatus 6 includes a service name file unit 6A and a key word dictionary unit 6B, as shown in FIG. 4A. The service name file unit 6A includes a plurality of service names and service numbers stored therein, and the key word dictionary unit 6B includes a plurality of key words and service numbers stored therein.

Referring again to FIG. 1, the CPU 8 reads information data corresponding to a service number obtained in the resulting of its matching procedure from the text information storage apparatus 7. The CPU 8 then converts information data into voice data and transfers the converted voice data to the voice output apparatus 5. The voice output apparatus 5 then converts voice information data from the CPU 8 into a voice signal to thereby supply the voice signal through the telephone line matching apparatus 3 and exchange means 2 to the telephone means 1, thereby allowing the user to hear the desired information in a voice form. The CPU 8 also receives a plurality of service names, key words and information data, which are newly inputted by means of service provider terminal means 9, and transmits service names and key words to the key word storage apparatus 6 and service information data to the next information storage apparatus 7, respectively, to register them therein.

Figure 2:
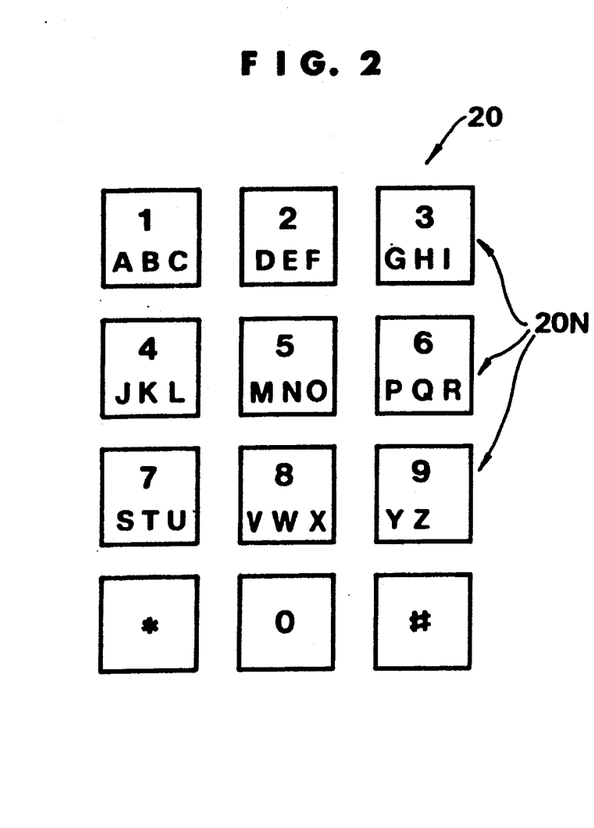
FIG. 2 is a configuration of a conventional character panel for inputting a plurality of characters.

FIG. 2 shows a conventional character panel 20 for inputting characters. The character panel 20 is constructed in the manner to input a character string by selectively pressing a plurality of buttons 20N the number of times corresponding to the position of the predetermined character, to which a number of characters are respectively allotted. For example, in order to input English characters "C, E, G", the user must press the buttons 1, 2, 3 of a plurality of buttons 20N the number of times of 3, 2, 1 corresponding to relative sequential position of each character, in the manner that the format "111, 22, 3" is formed. However, such configuration causes the inconvenience in pressing the same button repeatedly. Further, the receiving error often happens due to the vague input, since the time interval for pressing each of a plurality of buttons 20N to input a character string is often uneven. For example, the characters "ac", "ca", and "bb" are inputted by pressing button 1 four times to form the format "1111" in the same way. Consequently, it is difficult for a receiving side to distinguish between the inputted characters.

Figure 3:
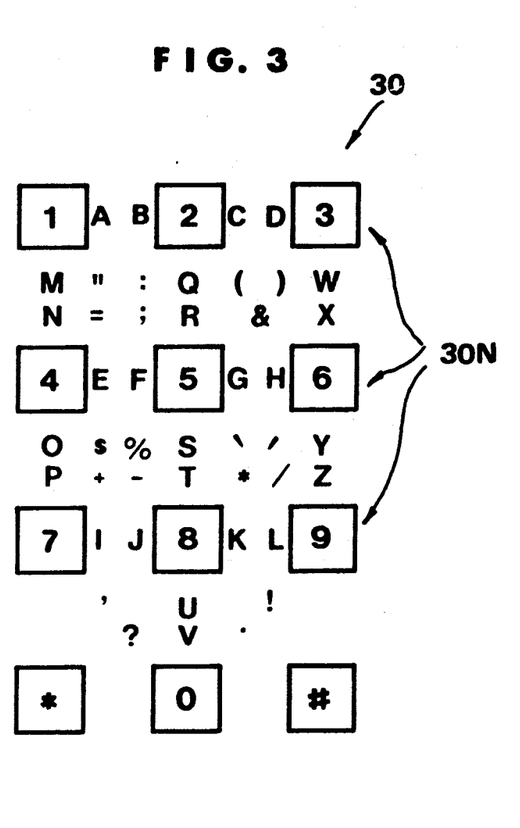
FIG. 3 is a configuration of a character panel used in a voice information service system according to the invention.

In order to resolve these problems, a character panel 30 having a character arrangement in connection with a plurality of buttons 30N mounted on the telephone means 1 according to the invention is shown in FIG. 3.

Inputting a character by using the character panel 30 is performed by pressing two adjacent buttons in a given order, in the manner that a button close to the representing character is firstly pressed, and then another button spaced away therefrom in the same direction is pressed. For example, inputting the word "school" is made by pressing two adjacent buttons of a plurality of buttons 30N corresponding to the position of each of characters "s, c, h, o, o, l" in a given order in connection with the position of the representing character in the character panel 30, so that the format "58, 23, 65, 47, 47, 98" may be formed. Therefore it is easy to input characters, while it can solve the inconvenience in pressing the same button several times as in the prior art. Also, since only two figure buttons per each character are operated, it can prevent the receiving error from occurring, which often happens in a conventional character panel 20 as shown in FIG. 2. On the other hand, the character panel 30 can be manufactured separately from the telephone means 1 or be manufactured by directly printing them on the telephone means 1.

Figure 4B:
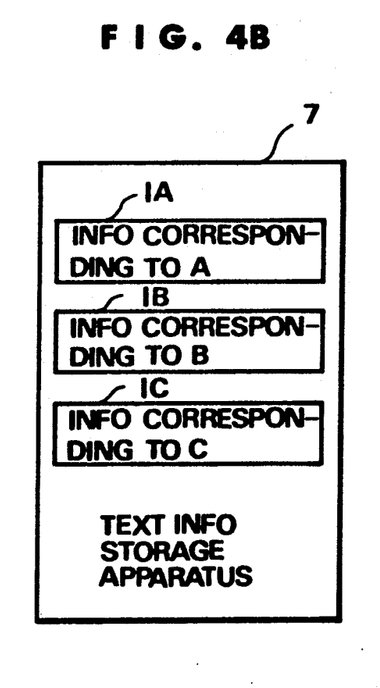

FIG. 4A and FIG. 4B represent configurations of a key word storage apparatus 6 and a text information storage apparatus 7. The key word storage apparatus 6 includes a service name file unit 6A and a key word dictionary unit 6B. The text information storage apparatus 7 stores a plurality of information to be provided. It is assumed that service names are A, B, C. Service names A, B, C and service numbers i, j, k corresponding thereto are stored in the service name file unit 6A of the key word storage apparatus 6, so that the former, service names, may be stored in alphabetic order to increase the searching speed of the memory device, and the latter, service numbers, may be designated to avoid overlapping with one another. The key word dictionary unit 6B stores a plurality of key words obtained by dividing a service name of a usually compound noun type and an additional key word into each component word, and a plurality of service numbers corresponding thereto in alphabetic order. Herein, it is noted that one key word can have two or more service numbers. For example, a key word b1 has service numbers "j3" and "k", as shown in FIG. 4A, so that service names become key words of B, C. Assuming that the service name is "stock market quotes", component words "stock", "market", "quotes" become key words. Each of these key words is stored in the key word dictionary unit 6B with service numbers allotted to "stockmarketquotes". If two services such as, for example, "express bus time table" and "train time table" are present, each of "time" and "table" has two service numbers. The text information storage apparatus 7 stores information data IA, IB, IC . . . corresponding to each service name. Each of the information data is not uniform in shape and size.

FIG. 5 shows a block diagram illustrating the matching procedure between an input character string and a key word in the CPU 8 of FIG. 1. An input unit 11 syllabicates the input character string into characters to transfer them to a service name matching unit 12. The service name matching unit 12 attempts to match the transferred input character string with a service name. It then transfers it to an output unit 15 if successfully matching thereof; otherwise, it transfers the input character string to a key word matching unit 13. The key word matching unit 13 attempts to match the input character string with a plurality of the key words stored in the key word dictionary unit 6B to determine a prospective service name and to transfer it to an optimum service name determining unit 14. The optimum service name determining unit 14 determines an optimum service name, if two or more prospective service names are present, and then transfers it to the output unit 15. The output unit 15 outputs information data corresponding to the optimum service name to the telephone means 1. Detailed matching procedures will be described in detail below.

Figure 6:
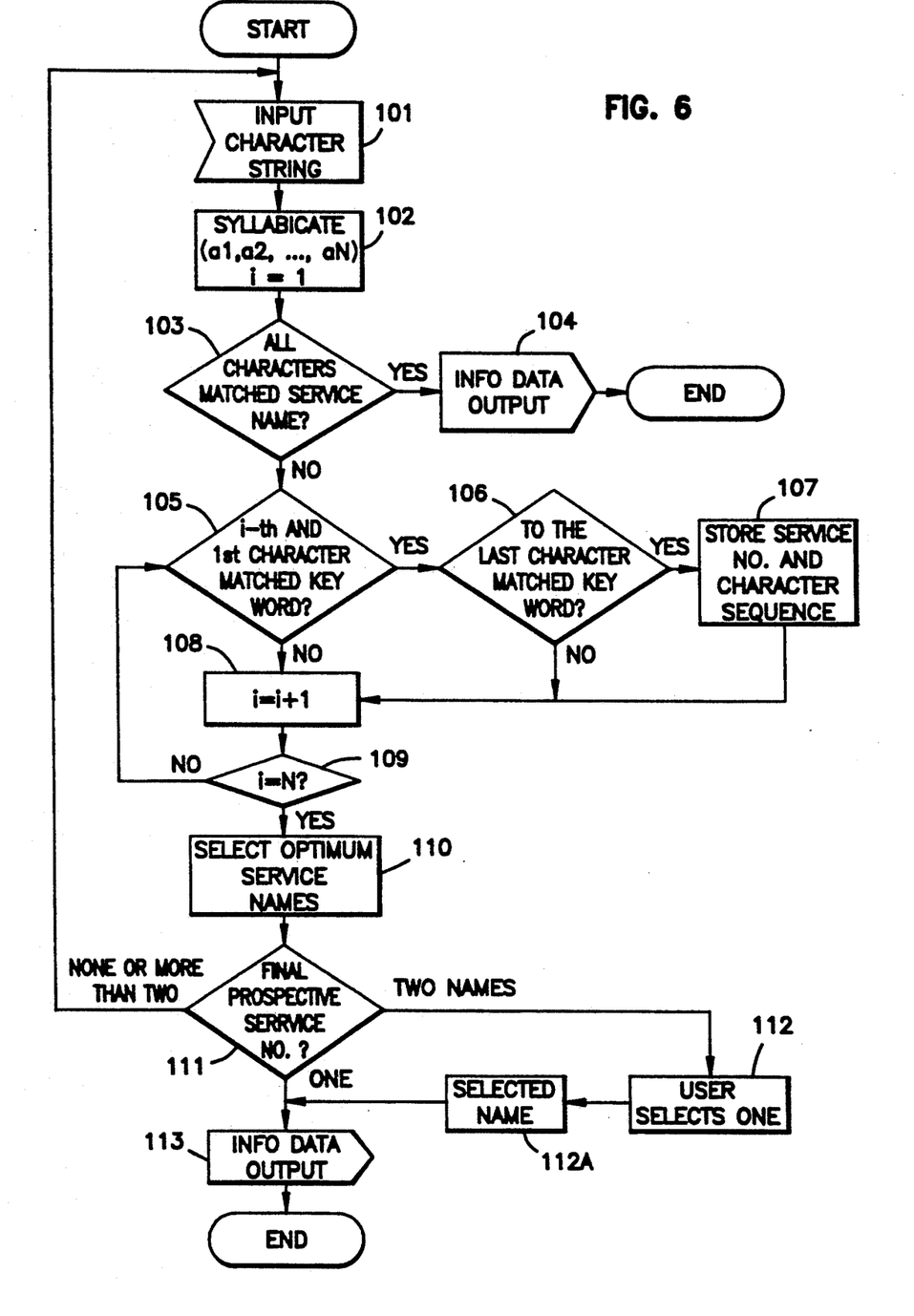

FIG. 6 shows a flow chart of the approximately matching procedures illustrated in FIG. 5. In the first step, the CPU 8 is initialized with a starting signal. An input character string is inputted in the form of character units at step 101. Step 101 then proceeds to step 102 to syllabicate the input character string, which is inputted without distinguishing between their component words, into character units a1, a2, a3 ... aN. Then, an attempt is made to match the input character string by character units with a plurality of service names stored at the service name file unit 6A in the key word storage apparatus 6, at step 103. Giving a concrete example, it is assumed that an input character string is "phonedirectory" and a service name to be matched is "phone banking", the first character "p" of the input character string is compared with first character "p" of the service name of a plurality of service names, and the next characters therebetween "h"0 and "h", "o" and "" . . . are compared with each other in order. At step 103, if the service name matched with all characters of the input character string exists, that is, the service name which is the same as the input character string exists, the step 103 proceeds to step 104 to output the corresponding service name. This ends the matching procedures.

On the contrary, if the matching is unsuccessful at step 103, step 103 proceeds to step 105 to compare the first character, "a1", of the input character string with the first character of the key word stored at the key word dictionary unit 6B in the key word apparatus 6 shown in FIG. 1. If their first characters are equal, step 105 proceeds to step 106, otherwise step 105 proceeds to step 108. At step 106, the next characters of the input character string are continuously and individually compared or matched with the second character, third character, . . . , of the key word in the key word dictionary unit 6B. If the key word matched successfully with their last characters exists, step 106 proceeds to step 107, otherwise step 106 proceeds to step 108. At step 107, both service numbers with respect to the key words which are matched at step 106 and the input character string numbers representing a corresponding character sequence of the input character string with respect to the matched key word, are stored in a matching result file and step 107 proceeds then to step 108. For example, assuming that the input character string is "credit card check", and the key words in which the matching has been accomplished are "credit", "credit card", "card" and "check", in the way that the key word "credit" has the registration numbers of 5, 7 and 8, the key word "credit card" has the registration number of 5, and the key word "card" has the registration numbers of 5, 6, 7 and 9, the key words "credit", "credit card", "card" and "check" are then registered at service number 5 to coincide with the sequence of the matched input character string, as shown in TABLE 1 in which an example of the matching result file is illustrated. That is, the key word "credit" is registered at the positions from the first to the sixth character of the input character string.

Returning to FIG. 6, at step 108, a next character number is added either to the first character of the input character number (i) at step 105, or to the partially matched character thereof at step 106. Step 108 proceeds then to step 109 to identify whether the matching has been performed to the last character (aN) of the input character string. If the matching is completed, step 109 proceeds to step 110, otherwise step 109 proceeds to step 105 in order to re-match the input character string having an increased character number with the key word. At step 110, the matching result file stored at step 107 is investigated to select optimum service names.

A selecting procedure of an optimum service name will be described with reference to TABLE 1. An input character string, "credit card check" consisting of 15 characters has been matched with four key words ("credit", "credit card", "card", "check") according to the results of their matching. Key words, "credit", "credit card", "card" and "check" matched successfully at service number 5 are 4. Arranging the key words to avoid overlap with each other, the key words become "credit card check", "credit check" and "card check", etc. The number of key words for the arrangement "credit card check" containing the maximum number of key words is 3. This number is the largest constituting number of key words, which are matched exclusively to each other. The maximum number of key words having service numbers, 6 and 7, is 2. In this case, the service names corresponding to service number 5 which is the largest number of key words are selected as optimum service names.

On the other hand, step 110 proceeds to step 111 to determine the number of prospective services to be finally selected. If the optimum service name selected at step 110 is step 1, step 111 proceeds to step 113 to select the corresponding service name, and to output it. If the number of optimum service names selected at step 110 is none or more than two, step 111 returns to step 101 to input the input character string again. If the number of the optimum service names selected at step 110 is two, step 111 proceeds to step 112 for the user to select one of them as indicated at step 112A. Thus, step 112 proceeds to step 113 to output the corresponding service names through the telephone means for the system user to select one of optimum service names, thereby completing the selecting procedures of the optimum service. Finally, information data corresponding to a service name selected during the matching procedures is outputted to the telephone means in a vocal form.

As described above, the invention can avoid the undesirable need for recalling or identifying an exact service number and item number one by one, notwithstanding that the character string is inputted using a conventional MFC type telephone. Also, the invention has prominent effects in exactly finding a service name or item name through only the approximately input operation by dividing a service name or an item name and an additional key word into their component words so as to store them in the key word dictionary unit in an ordered sequence, by comparing input character string, which has been continuously inputted, without making a distinction into its component words, with key words stored in the key word dictionary in ordered sequence, and by selecting either a service name or an item name which has the largest number of key matched words.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention.

TABLE 1

| INPUT SERVICE NUMBER | EXAMPLE OF THE MATCHING RESULT FILE CONTENTS | MAXIMUM NUMBER OF KEY WORDS |
|---|---|---|
| | CREDITCARDCHECK | |
| 5 | CREDIT CREDITCARD CARD CHECK | 4 |
| 6 | CREDIT CARD | 2 |
| 7 | CARD CHECK | 2 |
| 8 | CREDIT | 1 |
| 9 | CHECK | 1 |
| . | . | . |

What is claimed is:

1. A method for approximately matching an input character string having a first character through a last character input by a user having a telephone with DTMF buttons with a key word and for vocally outputting information data in response to the input character string to the telephone, said method comprising:

providing a character panel for the telephone with DTMF buttons with an alphabetic-numeric character display orderly arranged on the character panel for transmitting DTMF signals by pressing two different DTMF buttons in an orderly sequence thereby specifically designating a single character of the display of alphabetic and numeric characters;

A. inputting the character string to a voice information service system with a central processing unit (CPU) for syllabicating the inputted character string into character units a1, a2, a3 ... aN without distinguishing between the component units of the character string;

B. discriminating whether all the character units match with all characters of any one of a plurality of service names stored at a service name file unit in a key word storage apparatus and if matched, vocally outputting the corresponding service name to the telephone thereby ending matching procedures, and if not matched;

C. comparing the first character unit of the input character string with the first character of key words stored at a key word dictionary unit in the key word storage apparatus, and if matched;

D. sequentially comparing the next character unit of the input character string by continuously and individually matching with the second character, third character, ... Nth character, of the key word in the key word dictionary unit and if the key word is matched to the Nth character unit of the input character string;

E. storing service numbers with respect to the matched key word and with respect to the input character string representing a corresponding character sequence of the input character string with respect to the matched key word in a matching result file, and if the key word is not matched to the Nth character unit of the input character string;

F. sequentially adding the next character unit to the first character unit of the input character string which is not matched to the first character unit as step C or adding the next character unit of the input string to the input string which is not matched to the Nth character unit at step D to the key word; and G. identifying whether matching has been performed to the last character unit (aN) of the input character string, and if the matching between all the characters of the input character string and those of the key word is not completed at step F, returning to step C to re-match the input character string of step F, and if completed, reviewing the stored matching result file and selecting the optimum service names by determining a number of prospective services to be finally selected, where one optimum service name is selected and outputted to the telephone in vocal form, and where the number of optimum service names selected is none or more than two, the input character string is input again as in step A, and where the number of the optimum service names selected is two, the two selected optimum service names are vocally output through the telephone to the user to allow the user to select one of the optimum service names thereby completing the selecting procedure of the optimum service name and outputting information data corresponding to the service name selected in vocal form through the telephone.

2. A method for approximately matching an input character string having a first character through a last character input by a user having a telephone with a character panel with an alphabetic-numeric character display and a plurality of DTMF buttons which are orderly arranged on the character panel for transmitting DTMF signals by pressing two different buttons of the plurality of buttons in an ordered sequence thereby specifically designating a single character of the display of alphabetic and numeric characters with a key word and for vocally outputting information data in response to the input character string to the telephone, said method comprising:

A. inputting the character string to a voice information service system with a central processing unit (CPU) for syllabicating the inputted character string into character units a1, a2, a3 ... aN without distinguishing between the component units of the character string;
B. discriminating whether all the character units match with all characters of any one of a plurality of service names stored at a service name file unit in a key word storage apparatus and if matched, vocally outputting the corresponding service name to the telephone thereby ending matching procedures, and if not matched;
C. comparing the first character unit of the input character string with the first character of key words stored at a key word dictionary unit in the key word storage apparatus, and if matched;
D. sequentially comparing the next character unit of the input character string by continuously and individually matching with the second character, third character, ... Nth character, of the key word in the key word dictionary unit and if the key word is matched to the Nth character unit of the input character string;
E. storing service numbers with respect to the matched key word and with respect to the input character string representing a corresponding character sequence of the input character string with respect to the matched key word in a matching result file, and if the key word id not matched to the Nth character unit of the input character string;
F. sequentially adding the next character unit to the first character unit of the input character string which is not matched to the first character unit at step C or adding the next character unit of the input string to the input string which is not matched to the Nth character unit at step D to the key word; and
G. identifying whether matching has been performed to the last character unit (aN) of the input character string, and if the matching between all the characters of the input character string and those of the key word is not completed at step F, returning to step C to re-match the input character string of step F, and if completed, reviewing the stored matching result file and selecting the optimum service names by determining a number of prospective services to be finally selected, where one optimum service name is selected and outputted to the telephone in vocal form, and where the number of optimum service names selected is none or more than two, the input character string is input again as in step A, and where the number of the optimum service names selected is two, the two selected optimum service names are vocally output through the telephone to the user to allow the user to select one of the optimum service names thereby completing the selecting procedure of the optimum service name and outputting information data corresponding to the service name selected in vocal form through the telephone.

* * * * *

UNITED STATES PATENT AND TRADEMARK OFFICE
CERTIFICATE OF CORRECTION

PATENT NO. : 5,255,310

DATED : August 19, 1993

INVENTOR(S) : Eung I. Kim et al.

It is certified that error appears in the above-identified patent and that said Letters Patent is hereby corrected as shown below:

In Column 5, line 60, "next" should read --text--.
In Column 6, line 61, "j3" should read --"j"--.
In Column 7, line 46, " "h"0 and "h", "o"    should read --"h" and "h", "o" and "o" ...--.
In Column 8, line 62, insert --optimum-- after the word "corresponding".
In Column 9, line 16, "key matched" should read --matched key--.
In Column 9, line 16, insert --,-- after the word "words".
In Column 11, line 27, in Claim 2, "id" should read --is--.

Signed and Sealed this

Twenty-second Day of August, 1995

Attest:

BRUCE LEHMAN

*Attesting Officer*  *Commissioner of Patents and Trademarks*